United States Patent [19]

Sasaki et al.

[11] Patent Number: 5,011,887

[45] Date of Patent: Apr. 30, 1991

[54] THERMOPLASTIC RESIN COMPOSITION

[75] Inventors: Isao Sasaki; Naoki Yamamoto, both of Hiroshima; Akira Yanagase, Otake, all of Japan

[73] Assignee: Mitsubishi Rayon Co., Ltd., Tokyo, Japan

[21] Appl. No.: 320,533

[22] Filed: Mar. 8, 1989

[30] Foreign Application Priority Data

Mar. 10, 1988 [JP] Japan .................................. 63-57039

[51] Int. Cl.⁵ .............................................. C08L 51/08
[52] U.S. Cl. ........................................ 525/63; 525/64; 525/69; 525/474; 525/479; 525/903
[58] Field of Search ................ 525/63, 64, 69, 474, 525/479, 903

[56] References Cited

U.S. PATENT DOCUMENTS

| | | | |
|---|---|---|---|
| 4,581,411 | 4/1986 | Liang et al. | 525/189 |
| 4,695,602 | 9/1987 | Crosby et al. | 524/439 |
| 4,743,639 | 5/1988 | Liang | 524/188 |
| 4,797,448 | 1/1989 | Liang | 525/106 |
| 4,849,469 | 7/1989 | Crosby et al. | 524/439 |

FOREIGN PATENT DOCUMENTS

0260552   3/1988   European Pat. Off. .

*Primary Examiner*—John C. Bleutge
*Assistant Examiner*—Ralph H. Dean, Jr.
*Attorney, Agent, or Firm*—Cushman, Darby & Cushman

[57] ABSTRACT

A thermoplastic resin composition superior in heat stability and impact resistance, which comprises 95-5% by weight of a thermoplastic polymer (A) selected from homopolymers and copolymers of ethylenic unsaturated monomers or from polymers of bifunctionally reactive compounds and 5-95% by weight of a compound-rubber-based graft copolymer which is produced by the graft polymerization of one or more vinyl monomers onto compound rubber particles having an average diameter of 0.08-0.6 $\mu$m and structures in which 10-90% by weight of a polyorganosiloxane rubber component and 90-10% by weight of a polyalkyl(meth)acrylate rubber component are tangled together so as not to be separable from each other.

14 Claims, No Drawings

THERMOPLASTIC RESIN COMPOSITION

BACKGROUND OF THE INVENTION

1. Field of the Invention

The present invention relates to a novel thermoplastic resin composition comprising a blend of thermoplastic polymer with a graft copolymer which is produced by graft polymerizing specific amounts of at least one vinyl monomer onto a compound rubbery polymer.

2. Description of the Prior Art

Thermoplastic polymers, including resins rigid at normal temperature, rubbers or elastomers exhibiting rubber elasticity at normal temperature, and polymers exhibiting properties intermediate between those of the above two types, are used extensively. In addition, various polymer compositions have been proposed up to now for the purpose of improving properties, especially impact resistance, of the above thermoplastic polymers. For example, it is known that thermoplastic polymers are blended with diene polymers or with acrylic polymers. Some of these blends are successful in the improvement of impact resistance.

According to such prior art, however, other properties are sacrificed or the impact resistance cannot be improved sufficiently.

In consequence, it is still demanded today to improve the impact resistance more effectively.

SUMMARY OF THE INVENTION

It is therefore an object of the present invention to provide a thermoplastic resin composition which is improved sufficiently in impact resistance without sacrificing other properties.

Other objects and advantages of the present invention will be apparent from the following description.

DETAILED DESCRIPTION OF THE INVENTION

As a result of intensive studies, the present inventors have found that a composition having superior impact resistance, heat resistance, and weather resistance that have been unattainable according to the prior art can be obtained by blending a thermoplastic polymer with a graft copolymer based on a polyorganosiloxane-poly(meth)acrylate compound rubber. Based on this finding, the present invention has been accomplished.

The invention involves a thermoplastic resin composition comprising 95-5% by weight of a thermoplastic polymer (A) selected from homopolymers and copolymers of ethylenic unsaturated monomers or from polymers of bifunctionally reactive compounds and 5-95% by weight of a compound-rubber-based graft copolymer (B) which is produced by the graft polymerization of one or more vinyl monomers onto compound-rubber particles having an average diameter of 0.08-0.6 $\mu$m and structures in which 10-90% by weight of a polyorganosiloxane rubber component and 90-10% by weight of a polyalkyl(meth)-acrylate rubber component (total of the rubber components is 100% by weight) are tangled together so as not to be separable from each other.

Thermoplastic polymers (A) for use in the present invention include (i) homopolymers and copolymers of one or more ethylenic unsaturated monomers, e.g. polyethylene, polypropylene, and polymethylpentene, and further those containing vinyl monomers as constituents, e.g. polyvinyl acetate, ethylene-vinyl acetate copolymer, ethylene-ethyl acrylate copolymer, and ethylenic ionomer resins, (ii) polymers of at least one bifunctionally reactive compound which is polymerizable by self-condensation, e.g. polyoxymethylene, acetal copolymer, and polyphenylene sulfide, and (iii) polymers of at least two bifunctionally reactive compounds which are polymerizable by polycondensation, e.g. polysulfone, polyethersulfone, polyetherimide, polyimide, polyetherketone, and polyurethane elastomer. These polymers can be used alone or in combination within the amount range of 95 to 5% by weight based on the whole resin composition.

Of the above-cited thermoplastic resins, the bifunctionally reactive compound polymers, because of their higher cohesive energy densities than those of the homopolymers and copolymers of ethylenic unsaturated monomers, form better dispersions with said compound-rubber-based graft copolymer and are more effectively improved in impact resistance. In particular, polyphenylene sulfide is remarkably improved in impact resistance by blending therewith said compound-rubber-based graft copolymer.

The compound-rubber-based graft copolymer (B) for use in the present invention is produced by the graft polymerization of one or more vinyl monomers onto compound-rubber particles having an average diameter of 0.08-0.6 $\mu$m and structures wherein 10-90% by weight of a polyorganosiloxane rubber component and 90-10% by weight of a polyalkyl(meth)acrylate rubber component (total amount of the rubbers is 100% by weight) are tangled together so as to be substantially inseparable from each other.

The resin composition of the present invention cannot be obtained, when either of the polyorganosiloxane rubber component and the polyalkyl(meth)acrylate rubber component is used in place of the compound rubber or even any simple mixture of the two components is used as a rubber source. A resin composition which provides moldings superior in impact resistance and surface appearance can be obtained only when the polyorganosiloxane rubber component and the polyalkyl(meth)acrylate rubber component are compounded and united together with their molecular chains being entangled one with another.

If the content of polyorganosiloxane rubber component in the compound rubber exceeds 90% by weight, moldings from the resulting resin composition will have worse surface appearance. If the content of polyalkyl(meth)acrylate rubber component exceeds 90% by weight, moldings from the resulting resin composition will have low impact resistance. Therefore, the content of each rubber component in the compound rubber need to be within the range of 10 to 90% by weight (with the proviso that the total content of both components is 100% by weight). Preferably, the content of each component ranges from 20 to 80% by weight.

The average particle size of the compound rubber is desired to be within the range of 0.08 to 0.6 $\mu$m. If the average particle size is less than 0.08 $\mu$m, moldings from the resulting resin composition will have low impact resistance. If the average particle size exceeds 0.6 $\mu$m, the moldings will present worse surface appearance.

Compound rubbers having average particle sizes as defined above are best produced by an emulsion polymerization process, which comprises preparing first a polyorganosiloxane rubber latex, swelling then these rubber particles with an alkyl acrylate, and polymerizing it.

The polyorganosiloxane rubber component of the compound rubber can be synthesized from an organosiloxane and a crosslinking agent, where a graft-linking agent can be used jointly, examples of these materials being given below. Examples of the organosiloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These siloxanes may be used alone or in combination two or more. The amount of organosiloxane used is at least 50%, preferably at least 70%, by weight based on the polyorganosiloxane rubber component.

Suitable crosslinking agents for use herein are of the trifunctional or tetrafunctional silane family, including, for example, trimethoxy methylsilane, triethoxyphenylsilane, tetramethoxysilane, tetraethoxysilane, tetra-n-propoxysilane, and tetrabutoxysilane. In particular, tetraethoxysilane is preferred. The amount of crosslinking agent used is from 1 to 30% by weight based on the polyorganosiloxane rubber component.

Suitable graft-linking agents are compounds which can form organosiloxane units represented by the general formula

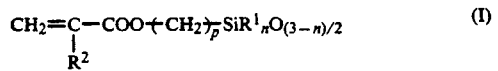  (I)

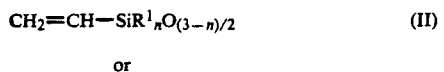  (II)

or

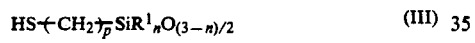  (III)

wherein $R^1$ denotes methyl, ethyl, propyl, or phenyl, $R^2$ denotes hydrogen or methyl, n denotes 0, 1, or 2, and p denotes a number of 1 to 6. (Meth)acryloyloxysiloxanes that can form units of the general formula (I) give high graft efficiencies, i.e. can form effective graft chains, hence being advantageous in developing impact resistance. Thus, methacryloyloxysiloxane is particularly preferable as a compound which can form the unit of general formula (I). The amount of graft-linking agent used is from 0 to 10% by weight based on the polyorganosiloxane rubber component.

The polymerization for the polyorganosiloxane rubber component can be carried out, for example, according to the process described in U.S. Pat. Nos. 2,891,920 and 3,294,725.

In a preferred embodiment of the present invention, the polyorganosiloxane rubber component is produced in the manner that a solution composed of the above-cited organosiloxane, graft-linking agent, and crosslinking agent is shear-mixed with water in the presence of a sulfonic acid type emulsifier such as alkylbenzenesulfonic acid or alkylsulfonic acid by using, for example, a homogenizer. Alkylbenzenesulfonic acid is best suited because it acts not only as an emulsifier for the organosiloxane but also as a polymerization initiator. In this case, the joint use of a metal alkylbenzenesulfonate, a metal alkylsulfonate, or the like is preferable since it is effective in stabilizing the polymer during the graft polymerization.

In the next place, the polyalkyl(meth)-acrylate rubber component of the compound rubber is synthesized from an alkyl(meth)acrylate, crosslinking agent, and graft-linking agent which are exemplified below.

Examples of the alkyl acrylate include methyl acrylate, ethyl acrylate, n-propyl acrylate, n-butyl acrylate, and 2-ethylhexyl acrylate and examples of the alkyl methacrylate include hexyl methacrylate, 2-ethylhexyl methacrylate, and n-lauryl methacrylate. Of the alkyl(meth)acrylates, preferred is n-butyl acrylate.

Examples of the crosslinking agent include ethylene glycol dimethacrylate, propylene glycol dimethacrylate, and 1,4-butanediol dimethacrylate.

Examples of the graft-linking agent include allyl methacrylate, triallyl cyanurate, and triallyl isocyanurate. The above crosslinking agents may be used alone or in combination two or more. This also applies to the above graft-linking agents. The total amount of crosslinking agent and graft-linking agent used is from 0.1 to 20% by weight based on the polyalkyl(meth)acrylate rubber component.

The polymerization for the polyalkyl(meth)-acrylate rubber component is carried out as follows: A polyorganosiloxane rubber latex prepared as described above is neutralized with an aqueous solution of sodium hydroxide, sodium carbonate, or the like, and the above-cited alkyl(meth)acrylate, crosslinking agent, and graft-linking agent are added to the neutralized latex to swell the polyorganosiloxane particles, and are polymerized by the action of an ordinary radical polymerization initiator. As the polymerization proceeds, net work of crosslinked polyalkyl(meth)acrylate rubber grow in the already formed network of crosslinked polyorganosiloxane rubber to form interlocked network of both rubbers, thus providing compound rubber particles in each of which the polyorganosiloxane rubber component and the polyalkyl(meth)acrylate rubber component are substantially inseparable from each other.

The compound rubber thus produced by emulsion polymerization can form a graft copolymer with a vinyl monomer. In each particle of this compound rubber, the polyorganosiloxane rubber component and the polyalkyl(meth)acrylate rubber component are firmly entangled together, hence being virtually inseparable by extraction with common organic solvents such as acetone and toluene. The gel fraction of the compound rubber is at least 80% by weight as measured by extraction with toluene at 100° C. for 12 hours.

Examples of the vinyl monomer to be graft polymerized onto this compound rubber include styrene, α-methylstyrene, methyl methacrylate, 2-ethylhexyl methacrylate, methyl acrylate, ethyl acrylate, butyl acrylate, acrylonitrile, and methacrylonitrile. These vinyl monomers may be used alone or in combination two or more. Of these monomers, preferred is styrene.

The respective proportions of the compound rubber and the vinyl monomer are from 30 to 95% by weight and from 5 to 70% by weight based on the weight of the graft copolymer. When the proportion of the vinyl monomer is less than 5% by weight, the dispersion of the graft copolymer in the resin composition will be insufficient and when the proportion of the vinyl monomer exceeds 70% by weight, moldings of the resin composition will exhibit undesirably low impact strength.

The latex of compound-rubber-based graft copolymer can be produced by polymerizing the above-mentioned vinyl monomer in one or more stage according to radical polymerization techniques.

The thus produced latex of compound-rubber-based graft copolymer is poured into a hot aqueous solution of metal salt such as calcium chloride or magnesium sulfate to salt out or coagulate the graft copolymer. Thereby the compound-rubber-based graft copolymer can be separated and recovered.

This compound-rubber-based graft copolymer (B) and the thermoplastic polymer (A) stated before are blended together to give a former or latter content of 5 to 95% by weight based on the weight of the whole resin composition, thereby yielding a thermoplastic resin composition which has unprecedentedly high heat stability, good weather resistance, and superior impact resistance.

Unlike common silicone resins or silicone rubbers, the compound-rubber-based graft copolymer (B), used in the present invention, having high compatibility with various thermoplastic polymers, can be blended uniformly therewith.

It is possible to add suitable materials, if necessary, selected from dyes and pigments, stabilizers, reinforcements, fillers, modifiers, flame retardants, etc.

The present invention is illustrated in more detail with reference to the following examples. In the following description, parts are all by weight.

The Izod impact strength was measured in accordance with ASTM D-256.

REFERENCE EXAMPLE 1

Preparation of compound-rubber-based graft copolymer S-1

100 Parts of a siloxane mixture composed of 2 parts of tetraethoxysilane, 0.5 part of γ-methacryloyloxypropyl-dimethoxymethylsilane, and 97.5 parts of octamethyl-cyclotetrasiloxane was added to 200 parts of distilled water containing 1 part of sodium dodecylbenzenesulfonate and 1 part of dodecylbenzenesulfonic acid. The resulting mixture was stirred preliminarily in a homomixer at 10,000 rpm and then emulsified by using a homogenizer under a pressure of 300 Kg/cm$^2$, giving an organosiloxane latex. This latex was poured into a separable flask equipped with a condenser and a stirrer, and was heated with stirring at 80° C. for 5 hours. After 48 hours' standing at room temperature, the latex was neutralized with an aqueous sodium hydroxide solution to pH 6.9 to finish the polymerization. Thus a polyorganosiloxane rubber latex-1 was obtained (polymerization yield 89.7%, average particle diameter of rubber 0.16 μm).

117 Parts of this polyorganosiloxane rubber latex-1 was placed in a separable flask equipped with a stirrer, and 57.5 parts of distilled water was added. After replacement of the air with nitrogen, the diluted latex was heated to 50° C. and a mixture of 33.95 parts of n-butyl acrylate, 1.05 parts of allyl methacrylate, and 0.26 part of t-butyl hydroperoxide was added. The whole mixture was stirred for 30 minutes to allow these monomers and hydroperoxide to penetrate into the polyorganosiloxane rubber particles.

A mixture of 0.002 part of ferrous sulfate, 0.006 part of disodium ethylenediaminetetraacetate, 0.26 part of Rongalite, and 5 parts of distilled water was further added to initiate the radical polymerization. Then the inner temperature of the flask was maintained at 70° C. for 2 hours to complete the polymerization, yielding a compound rubber latex. From measurement on a sample of this compound rubber latex, the average particle diameter of this compound rubber was found to be 0.19 μm. Another sample of the latex was dried up, and the residual solid was subjected to extraction with toluene at 90° C. for 12 hours to measure the gel content, which was found to be 97.3%.

A solution of 0.12 part of t-butyl peroxide in 30 parts of styrene was added dropwise over 15 minutes to the thus obtained rubber latex. The resulting mixture was maintained at 70° C. for 4 hours to complete the graft polymerization onto the compound rubber. The percentage of styrene polymerized was 91.5%. This latex of graft copolymer was dropped into 200 parts of hot water containing 1.5 wt% of calcium chloride to coagulate the whole polymer, which was then separated, washed, and dried at 75° C. for 16 hours, yielding 97.8 parts of a dry powder S-1 of graft copolymer.

REFERENCE EXAMPLE 2

Preparation of compound-rubber-based graft copolymer S-2

100 Parts of a siloxane mixture composed of 2 parts of tetraethoxysilane and 98 parts of octamethylcyclotetrasiloxane was added to 200 parts of distilled water containing 1 part of sodium dodecylbenzenesulfonate and 1 part of dodecylbenzenesulfonic acid. Similarly to the procedure of preparing the compound-rubber-based graft copolymer S-1, preliminary dispersion by using a homomixer, emulsification by using a homogenizer, and heating at 80° C. for 5 hours were conducted and the resulting latex was cooled, then allowed to stand for 48 hours, and neutralized with an aqueous sodium hydroxide solution to finish the polymerization, yielding a polyorganosiloxane rubber latex-2 (polymerization yield 88.9%, average particle diameter 0.16 μm).

57.5 Parts of distilled water was added to 117 parts of the polyorganosiloxane rubber latex-2. Similarly to the procedure of preparing the graft copolymer S-1, a mixture of 33.95 parts of n-butyl acrylate, 1.05 parts of allyl methacrylate, and 0.26 part of t-butyl hydroperoxide was added and the polymerization of acrylates was conducted. The average particle diameter of the thus obtained compound rubber in latex form was 0.20 μm and the gel content of this rubber was 92.4% as measured in toluene. In the same manner and under the same conditions as in the preparation of S-1, 30.0 parts of styrene together with 0.12 part of t-butyl hydroxide was added to the obtained compound rubber latex to graft polymerize onto this rubber. From the thus obtained latex, 97.6 parts of a compound-rubber-based graft copolymer S-2 was obtained by coagulation and separation.

REFERENCE EXAMPLE 3

Preparation of silicone rubber-based graft copolymer S-3

117 Parts of the polyorganosiloxane rubber latex-1 prepared in Reference Example 1 was placed in a separable flask, and 58 parts of distilled water was added. After replacement of the air with nitrogen, a mixture of 0.002 part of ferrous sulfate, 0.006 part of disodium ethylenediaminetetraacetate, 0.26 part of Rongalite, and 5 parts of distilled water was further charged into the flask, and a solution of 0.12 part of t-butyl peroxide in 30 parts of styrene was dropped thereinto over 15 minutes. Then the resulting mixture was heated to 65° C. and maintained at the same temperature for 4 hours and then the graft polymerization of styrene on the polyorganosiloxane rubber was finished. The percentage of styrene polymerized was 92.6%. The resulting latex was dropped into 200 parts of hot water containing 1.5 wt% of calcium chloride to coagulate the graft copolymer, which was then separated and dried, yielding 58.1 parts of a dry powder S-3.

EXAMPLES 1–4 AND COMPARATIVE EXAMPLES 1 AND 2

Six different resin compositions were prepared by blending compound-rubber-based graft copolymers S-1 and S-2 severally (except for Comparative Examples 1 and 2) with a polyethersulfone resin in varying proportion shown in Table 1, and melt-mixing these blends separately through a 40-mmφ single-screw, vent extruder at cylinder temperatures of 300 to 340° C., followed by pelletizing.

Test specimens for evaluating different properties were formed from dried pellets of each group by injection molding at a cylinder temperature of 350° C. and a mold temperature of 100° C.

Results of measuring properties are also shown in Table 1. In Comparative Examples 1 and 2, test specimens were formed and evaluated for properties, according to the procedure of Examples 1–4 except that the compound-rubber-based graft copolymer of the present invention was not used in Comparative Example 1 and was replaced by an SBS (styrene-butadiene-styrene block copolymer) rubber in Comparative Example 2.

TABLE 1

| | Composition | | Izod impact strength, ⅛" notched, at 23° C. (Kg · cm/cm) | Surface appearance of test specimen (plate) |
|---|---|---|---|---|
| | Polyethersulfone[1] (wt %) | Compound-rubber-based graft copolymer (wt %) | | |
| Example | | | | |
| 1 | 90 | S-1 10 | 10 | No yellowing |
| 2 | 80 | S-1 20 | 13 | No yellowing |
| 3 | 60 | S-1 40 | 17 | No yellowing |
| 4 | 80 | S-2 20 | 13 | No yellowing |
| Comparative Example | | | | |
| 1 | 100 | — | 6 | No yellowing |
| 2 | 80 | SBS rubber[2] 20 | 7 | Yellow-brown colored |

Notes
[1]Victrex 200P (made by Sumitomo Chem. Co., Ltd.)
[2]Kaliflex TR1101 (made by Shell Chem. Co.)

EXAMPLES 5–7 AND COMPARATIVE EXAMPLES 3 AND 4

Five different resin compositions were prepared from a polysulfone resin and the compound-rubber-based graft copolymer S-1 by blending together (in Comparative Example 3, only the polysulfone resin was used) in varying proportions shown in Table 2, and melt-mixing separately these blends (or the polysulfone resin) through a 40-mmφ single-screw, vent extruder, followed by pelletizing. Thereafter, test specimens were formed and evaluated, according to the procedure of Examples 1–4. Results of the evaluation are also shown in Table 2. In Comparative Examples 3 and 4, the evaluation was conducted in the same manner as in Examples 5-7.

TABLE 2

| | Composition | | Izod impact strength, ⅛" notched, at 23° C. (Kg · cm/cm) |
|---|---|---|---|
| | Polysulfone[1] (wt %) | Compound-rubber-based graft copolymer S-1 (wt %) | |
| Example | | | |
| 5 | 95 | 5 | 11 |
| 6 | 85 | 15 | 13 |
| 7 | 60 | 40 | 14 |
| Comparative Example | | | |
| 3 | 100 | — | 9 |
| 4 | 98 | 2 | 9 |

Note
[1]Udel P 1700 (made by Union Carbide Corp.)

EXAMPLES 8–10 AND COMPARATIVE EXAMPLES 5 AND 6

Test specimens of five different resin compositions were formed from a polyetherimide resin and the compound-rubber-based graft copolymer S-1 by blending together (in Comparative Example 5, only the polyetherimide resin was used) in varying proportions shown in Table 3, melt-mixing these blends separately (or polyetherimide resin) through a 40-mmφ single-screw, vent extruder, pelleting the extrudates separately, followed by injection molding. Results of property evaluation on these test specimens are also shown in Table 3. In Comparative Examples 5 and 6, the evaluation was conducted in the same manner as in Examples 8–10.

TABLE 3

| | Composition | | Izod impact strength, ⅛" notched, at 23° C. (Kg · cm/cm) |
|---|---|---|---|
| | Polyetherimide[1] (wt %) | Compound-rubber-based graft copolymer S-1 (wt %) | |
| Example | | | |
| 8 | 90 | 10 | 7 |
| 9 | 80 | 20 | 12 |
| 10 | 60 | 40 | 16 |
| Comparative Example | | | |
| 5 | 100 | — | 3 |
| 6 | 97 | 3 | 3.5 |

Note
[1]Ultem #1000 (made by General Electric Co.)

EXAMPLES 11–13 AND COMPARATIVE EXAMPLES 7–8

Test specimens of five different resin compositions were formed from a polypropylene resin and the compound-rubber-based graft copolymer S-1 by blending together (in Comparative Example 7, only the polypropylene resin was used and in Comparative Example 8, only a different-grade polypropylene resin was used) in varying proportions shown in Table 4, melt-mixing these blends (or the polypropylene resins) separately through a 40-mmφ single-screw, vent extruder, and pelletizing the extrudates separately, followed by injection molding. Results of property evaluation on these test specimens are also shown in Table 4. The resin composition of the present invention provides moldings which exhibit superior low-temperature impact resistance.

TABLE 4

| | Composition | | Izod impact strength, ⅛" notched (Kg·cm/cm) | |
|---|---|---|---|---|
| | Polypropylene (wt %) | Compound-rubber-based graft copolymer S-1 (wt %) | at 23° C. | at −10° C. |
| Example | | | | |
| 11 | Polypropylene[1] 90 | 10 | 9 | 7 |
| 12 | Polypropylene[1] 80 | 20 | 17 | 13 |
| 13 | Polypropylene[1] 60 | 40 | 18 | 15 |
| Comparative Example | | | | |
| 7 | Polypropylene[1] 100 | — | 3.5 | 2 |
| 8 | Polypropylene[2] 100 | — | 17 | 4 |

Notes,
[1]Noblen MA3 (made by Mitsubishi Petrochemical Co., Ltd.)
[2]Noblen MA6 (made by Mitsubishi Petrochemical Co., Ltd.)

EXAMPLES 14–16 AND COMPARATIVE EXAMPLE 9

Test specimens of four different resin compositions were formed from a polyphenylene sulfide resin (Tohpren weigh-average molecular weight 21,900) and the compound-rubber-based graft copolymer S-1 by blending together (in Comparative Example 9, only the polyphenylene sulfide resin was used) in varying proportions shown in Table 5, melt-mixing these blends separately (or the polyphenylene sulfide resin) through a 30-mmφ twin-screw extruder, and pelletizing the extrudates separately, followed by injection molding.

These test specimens were subjected to friction-abrasion tests, which were made by using a friction-abrasion tester (Model EFM-III-E, made by Toyo Baldwin Co., Ltd.) under a load of 5 Kg at a sliding speed of 30 mm/sec, wherein test specimens of the same resin composition were used on both the rotation side and the stationary side and the surfaces of test specimens were finished with sandpapers of grade No. 1500.

Results of measuring the Izod impact strength and the coefficient of dynamic friction are shown in Table 5.

TABLE 5

| | Composition | | Izod impact strength, ⅛" notched, at 23° C. (Kg·cm/cm) | Coefficient of dynamic friction |
|---|---|---|---|---|
| | Polyphenylene sulfide (wt %) | Compound-rubber-based graft copolymer S-1 (wt %) | | |
| Example | | | | |
| 14 | 90 | 10 | 14 | 0.20 |
| 15 | 80 | 20 | 22 | 0.18 |
| 16 | 70 | 30 | 26 | 0.16 |
| Comparative Example 9 | 100 | — | 2 | 0.42 |

EXAMPLE 17

Test specimens were formed by melt-mixing 60 parts of the resin composition of Example 15 with 40 parts of a glass fiber through a 30-mmφ twin-screw extruder, and pelletizing the extrudate, following by injection molding. The Izod impact strength (⅛" notched, at 23°C.) of these test specimens was found to be 16 kG·cm/cm.

COMPARATIVE EXAMPLE 10

The experiment of Example 15 was followed but using the graft copolymer powder S-3 prepared in Reference Example 3. That is, test specimens were formed by blending 80% of the same polyphenylene sulfide as used in Example 15 with 20 wt % of S-3, melt-mixing the blend through a 30-mmφ twin-screw extruder, and pelletizing the extrudate, followed by injection molding. The Izod impact strength (⅛" notched, at 23° C.) of these test specimens was found to be 11 Kg·cm/cm.

EXAMPLES 18 AND 19 AND COMPARATIVE EXAMPLE 11

Test specimens of three different resin compositions were formed from a glass fiber reinforced polyphenylene sulfide resin by blend it with the compound-rubber-based graft copolymer S-1 (in Comparative Example 11, only the polyphenylene sulfide resin was used) in proportions shown in Table 6, melt-mixing these blends separately (or the reinforced polyphenylene sulfide resin) through a 30-mmφ twin-screw extruder, and pelletizing the extrudates separately, followed by injection molding. Results of property evaluation on these test specimens are shown in Table 6. It can be seen from Table 6 that blends of glass fiber reinforced polyphenylene sulfide resin with the compound-rubber-based graft copolymer when milled sufficiently provide molding exhibiting superior impact resistance.

TABLE 6

| | Composition | | Izod impact strength, ⅛" notched, at 23° C. (Kg·cm/cm) |
|---|---|---|---|
| | Glass fiber reinforced PPS[2] (wt %) | Compound-rubber-based graft copolymer (wt %) | |
| Example | | | |
| 18 | 90 | S-1 10 | 15 |
| 19 | 80 | S-1 20 | 24 |
| Comparative Example 11 | 100 | — | 7 |

Note
[2]Ryton R4 (made by Phillips Petroleum Co., content of glass fiber: 40%)

EFFECT OF THE INVENTION

The thermoplastic resin composition of the present invention, having the above described structure and constitution, provides molding which, exhibiting unprecedentedly superior heat stability and impact resistance, can be used effectively over a wide range of applications including automotive, parts, electrical and electronic components, other machine parts, etc.

What is claimed is:
1. A thermoplastic resin composition comprising:
95–5% by weight of a sulfur-containing thermoplastic polymer (A) selected from the group consisting of polyphenylene sulfide, and polysulfone and

5–95% by weight of a compound-rubber-based graft copolymer (B) which is produced by the graft polymerization of one or more vinyl monomers onto compound rubber particles having an average particle diameter of 0.08–0.6 μm and structures in which 10–90% by weight of a polyorganosiloxane rubber component and 90–10% by weight of a polyalkyl(meth)acrylate rubber component are tangled together so as not to be separable from each other and the total amount of the polyorganosiloxane rubber component and polyalkyl(meth)acrylate rubber component is 100% by weight.

2. The thermoplastic resin composition of claim 1, wherein the compound rubber consists essentially of (i) a polyorganosiloxane rubber component produced from an organosiloxane and a crosslinking agent by emulsion polymerization and (ii) a polyalkyl(meth)acrylate rubber component produced by impregnating the polyorganosiloxane rubber component with the corresponding alkyl(meth)acrylate, a crosslinking agent and a graft-linking agent, and polymerizing the mixture.

3. The thermoplastic resin composition of claim 2, wherein the main skeleton of the polyorganosiloxane rubber component has repeating units of dimethylsiloxane and the main skeleton of the polyalkyl(meth)acrylate rubber component has repeating units of n-butyl acrylate.

4. The thermoplastic resin composition of claim 2, wherein the gel content of the compound rubber is at least 80% by weight as measured by extraction with toluene.

5. The thermoplastic resin composition of claim 3, wherein the vinyl monomer to be graft polymerized onto the compound rubber is methylmethacrylate.

6. The thermoplastic resin composition of claim 3, wherein the vinyl monomer to be graft polymerized onto the compound rubber is styrene.

7. The thermoplastic resin of claim 3, wherein the vinyl monomer grafted onto the compound rubber is a mixture of acrylonitrile and styrene.

8. The thermoplastic resin composition of claim 1, wherein the compound rubber consists essentially of (i) a polyorganosiloxane rubber component produced from an organosiloxane, a crosslinking agent and a graft-linking agent by emulsion polymerization and (ii) a polyalkyl(meth)acrylate rubber component produced by impregnating the polyorganosiloxane rubber component with the corresponding alkyl(meth)acrylate, a crosslinking agent and a graft-linking agent, and polymerizing them.

9. The thermoplastic resin composition of claim 8, wherein the main skeleton of the polyorganosiloxane rubber component has repeating units of dimethylsiloxane and the main skeleton of the polyalkyl(meth)acrylate rubber component has repeating units of n-butyl acrylate.

10. The thermoplastic resin composition of claim 8, wherein the gel content of the compound rubber is at least 80% by weight as measured by extraction with toluene.

11. The thermoplastic resin composition of claim 9, wherein the vinyl monomer to be graft polymerized onto the compound rubber is methylmethacrylate.

12. The thermoplastic resin composition of claim 9, wherein the vinyl monomer to be graft polymerized onto the compound rubber is styrene.

13. The thermoplastic resin composition of claim 9, wherein the vinyl monomer grafted onto the compound rubber is a mixture of acrylonitrile and styrene.

14. The thermoplastic resin composition of claim 1, wherein the polymer of bifunctionally reactive compounds is a polyphenylene sulfide.

* * * * *